(12) United States Patent
Chatterji et al.

(10) Patent No.: US 7,022,755 B1
(45) Date of Patent: Apr. 4, 2006

(54) RESILIENT CEMENT COMPOSITIONS AND METHODS OF CEMENTING

(75) Inventors: Jiten Chatterji, Duncan, OK (US); D. Chad Brenneis, Marlow, OK (US); Roger S. Cromwell, Walters, OK (US); Bobby J. King, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/051,020

(22) Filed: Feb. 4, 2005

(51) Int. Cl.
*C04B 24/26* (2006.01)

(52) U.S. Cl. .................. 524/8; 524/4; 524/5
(58) Field of Classification Search ........... 524/4–5, 524/8; 523/130
See application file for complete search history.

(56) References Cited

U.S. PATENT DOCUMENTS

| | | | |
|---|---|---|---|
| 2,805,719 A | 9/1957 | Anderson | 166/29 |
| 3,228,907 A | 1/1966 | Eash | 260/29.7 |
| 3,926,257 A | 12/1975 | Marrast et al. | 166/293 |
| 4,151,150 A | 4/1979 | Peters et al. | 260/29.7 R |
| 4,537,918 A | 8/1985 | Parcevaux et al. | 523/130 |
| 4,721,160 A | 1/1988 | Parcevaux et al. | 166/293 |
| 4,767,460 A | 8/1988 | Parcevaux et al. | 106/90 |
| 4,808,641 A | 2/1989 | Yagi et al. | 524/5 |
| 5,016,711 A | 5/1991 | Cowan | 166/250 |
| 5,133,409 A | 7/1992 | Bour et al. | 166/293 |
| 5,135,577 A | 8/1992 | Brothers | 106/724 |
| 5,159,980 A | 11/1992 | Onan et al. | 166/294 |
| 5,293,938 A | 3/1994 | Onan et al. | 166/293 |
| 5,389,706 A | 2/1995 | Heathman et al. | 524/5 |
| 5,588,488 A | 12/1996 | Vijn et al. | 166/293 |
| 5,588,489 A | 12/1996 | Chatterji et al. | 166/293 |
| 5,672,203 A | 9/1997 | Chatterji et al. | 106/808 |
| 5,688,844 A | 11/1997 | Chatterji et al. | 524/8 |
| 5,711,801 A | 1/1998 | Chatterji et al. | 106/789 |
| 5,795,924 A | 8/1998 | Chatterji et al. | 523/130 |
| 5,820,670 A | 10/1998 | Chatterji et al. | 106/727 |
| 5,945,387 A | 8/1999 | Chatterji et al. | 507/224 |
| 5,964,293 A | 10/1999 | Chatterji et al. | 166/294 |
| 6,019,835 A | 2/2000 | Chatterji et al. | 106/725 |
| 6,098,711 A | 8/2000 | Chatterji et al. | 166/294 |
| 6,156,808 A | 12/2000 | Chatterji et al. | 516/116 |
| 6,227,294 B1 | 5/2001 | Chatterji et al. | 166/293 |
| 6,234,251 B1 | 5/2001 | Chatterji et al. | 166/295 |
| 6,258,757 B1 | 7/2001 | Sweatman et al. | 507/219 |
| 6,271,181 B1 | 8/2001 | Chatterji et al. | 507/219 |
| 6,297,202 B1 | 10/2001 | Chatterji et al. | 507/261 |
| 6,328,106 B1 | 12/2001 | Griffith et al. | 166/295 |
| 6,330,917 B1 | 12/2001 | Chatterji et al. | 166/295 |
| 6,401,817 B1 | 6/2002 | Griffith et al. | 166/295 |
| 6,417,142 B1 * | 7/2002 | Chatterji et al. | 507/265 |
| 6,448,206 B1 | 9/2002 | Griffith et al. | 507/219 |
| 6,478,868 B1 | 11/2002 | Reddy et al. | 106/696 |
| 6,503,870 B1 | 1/2003 | Griffith et al. | 507/219 |
| 6,508,306 B1 | 1/2003 | Reddy et al. | 166/295 |
| 6,516,884 B1 | 2/2003 | Chatterji et al. | 166/294 |
| 6,555,507 B1 | 4/2003 | Chatterji et al. | 507/219 |
| 6,593,402 B1 | 7/2003 | Chatterji et al. | 524/7 |
| 6,641,660 B1 | 11/2003 | Chatterji et al. | 106/727 |
| 6,668,928 B1 | 12/2003 | Brothers | 166/292 |
| 6,722,433 B1 | 4/2004 | Brothers et al. | 166/288 |
| 6,730,131 B1 | 5/2004 | Behler et al. | 8/137 |
| 6,774,146 B1 | 8/2004 | Savoly | 516/66 |
| 2002/0033263 A1 | 3/2002 | Chatterji et al. | 166/292 |
| 2003/0092582 A1 | 5/2003 | Reddy et al. | 507/100 |
| 2003/0116319 A1 | 6/2003 | Brothers et al. | 166/287 |
| 2004/0149431 A1 | 8/2004 | Wylie et al. | 166/242.1 |
| 2004/0167248 A1 | 8/2004 | Brothers et al. | 523/130 |

OTHER PUBLICATIONS

Halliburton brochure entitled "Latex 2000 Cement Additive" dated 1998.
Halliburton brochure entitled Stabilizer 434B Latex Stabilizer dated 1999.
Halliburton brochure entitled "Stabilizer 434C Surfactant" dated 1998.
Patent application entitled "Improved Resilient Cement Compostions and Methods of Cementing" by Jiten Chatterji et al., filed Feb. 4, 2005, as U.S. Appl. No. 11/051,957.

\* cited by examiner

*Primary Examiner*—Peter Szekely
(74) *Attorney, Agent, or Firm*—Craig W. Roddy; Baker Botts L.L.P.

(57) ABSTRACT

Resilient cement compositions and methods of cementing using the compositions are disclosed. A resilient cement composition of the invention comprises hydraulic cement, an aqueous rubber latex and a rubber latex stabilizing surfactant comprising an iso-dodecyl alcohol ether sulfonate ethoxylated with from about 10 to about 20 moles of ethylene oxide.

20 Claims, No Drawings

US 7,022,755 B1

RESILIENT CEMENT COMPOSITIONS AND METHODS OF CEMENTING

BACKGROUND OF THE INVENTION

1. Field of the Invention

The present invention relates generally to resilient cement compositions comprising a hydraulic cement, an aqueous rubber latex and a rubber latex stabilizing surfactant and methods of cementing using the resilient cement composition.

2. Description of the Prior Art

Resilient hydraulic cement compositions are commonly utilized above ground level and below ground level. An example of below ground level cement operations involves cementing pipe strings such as casings and liners in well bores. In performing primary cementing, a resilient hydraulic cement composition is pumped into the annular space between the walls of the well bore and the exterior surfaces of the pipe string disposed therein. The resilient cement composition is permitted to set in the annular space thereby forming an annular sheath of hardened, resilient and substantially impermeable cement therein. The resilient cement sheath physically supports and positions the pipe string in the well bore and bonds the exterior surfaces of the pipe string to the walls of the well bore whereby the undesirable migration of fluids between zones or formations penetrated by the well bore is prevented.

The cement compositions utilized for cementing above or below ground often must develop high strength after setting and also have sufficient resiliency, i.e., elasticity and ductility, to resist the loss of bonds between the set cement composition and metal pipe or the like. Also, the cement composition must be able to resist cracking and/or shattering as a result of movements, impacts and shocks subsequently generated. The bond loss, cracking or shattering of the set cement allows leakage of fluids through the cement which can be highly detrimental.

The cement sheath in the annulus between a pipe string and the walls of a well bore often fail due to pipe movements which cause shear and compressional stresses to be exerted on the set cement. Such stress conditions are commonly the result of relatively high fluid pressure and/or temperatures inside the cemented pipe string during testing, perforating, fluid injection or fluid production. The high internal pipe pressure and/or temperature results in the expansion of the pipe string, both radially and longitudinally, which places stresses on the cement sheath causing it to crack or causing the cement bonds between the exterior surfaces of the pipe or the well bore walls or both to fail which allows leakage of formation fluids, etc.

Thus, there are needs for improved well cement compositions and methods whereby after setting, the cement compositions form highly resilient solid masses which have high compressive, tensile and bond strengths sufficient to withstand stresses without failure.

SUMMARY OF THE INVENTION

The present invention provides improved resilient cement compositions and methods of cementing. An embodiment of the invention comprises a hydraulic cement, an aqueous rubber latex present in an amount in the range of from about 5% to about 45% by weight of hydraulic cement in the composition and a rubber latex stabilizing surfactant comprising an iso-dodecyl alcohol ether sulfate ethoxylated with from about 10 to about 20 moles of ethylene oxide.

Another embodiment of the invention comprises methods of cementing comprising the following steps. A cement composition is prepared or provided which hardens into a resilient solid mass and has high compressive, tensile and bond strengths. The cement composition comprises a hydraulic cement, an aqueous rubber latex, and a rubber latex stabilizing surfactant comprising an iso-dodecyl alcohol ether sulfate ethoxylated with from about 10 to about 20 moles of ethylene oxide. The cement composition is placed in a location to be cemented and is then allowed to harden.

It is, therefore, a general object of the present invention to provide improved resilient cement compositions and methods of cementing. The cement compositions harden into resilient solid masses having high compressive, tensile and bond strengths which can be placed above ground or underground including, but not limited to, well bores.

Other and further objects, features and advantages of the present invention will be readily apparent to those skilled in the art upon a reading of the description of preferred embodiments which follows.

DESCRIPTION OF PREFERRED EMBODIMENTS

As mentioned, the present invention provides improved resilient cement compositions and methods of their use. The hardened cement compositions are highly resilient solid masses having high compressive, tensile and bond strengths. When utilized for cementing pipe in well bores, the hardened cement compositions effectively withstand pipe movement disposed in well bores due to expansion, contraction, impacts, shocks or the like.

The cement compositions of this invention basically comprise a hydraulic cement, an aqueous rubber latex present in an amount in the range of from about 5% to about 45% by weight of hydraulic cement in the composition, and a rubber latex stabilizing surfactant comprising an iso-dodecyl alcohol ether sulfate ethoxylated with from about 10 to about 20 moles of ethylene oxide.

Various hydraulic cements can be utilized in accordance with the present invention. The hydraulic cements include, but are not limited to, Portland cements, slag cements, pozzolana cements, gypsum cements, aluminous cements and silica cements. Of these, Portland cements or their equivalents are generally preferred for use in accordance with the present invention. Portland cements of the types defined and described in API Specification for Materials and Testing for Well Cements, API SPECIFICATION 10, 5$^{th}$ Edition, Dated Jul. 1, 1990 of the American Petroleum Institute are particularly suitable. Preferred API Portland cements include Classes A, B, C, G and H, with API Classes G and H being more preferred and Class G being the most preferred.

A variety of well known rubber materials which are commercially available in aqueous latex form, i.e., aqueous dispersions or emulsions, can be utilized in accordance with the present invention. For example, aqueous cis-polyisoprene rubber latex (natural rubber) and most of its modified types can be utilized. Synthetic polymer latexes of various types can also be used including aqueous nitrile rubber latex, aqueous ethylene-propylene rubber latex, aqueous styrene-butadiene rubber latex, aqueous nitrile-butadiene rubber latex, aqueous butyl rubber latex, and aqueous neoprene rubber latex. The above described rubber latexes can include various other rubber compositions as are well known by those skilled in the art. The other components of the cement composition of this invention can be added directly to the aqueous rubber latex utilized. Of the various aqueous rubber latexes which can be utilized, styrene-butadiene rubber latex is generally preferred.

A styrene-butadiene rubber latex is prepared by emulsion polymerization. The aqueous phase of the emulsion is an aqueous colloidal dispersion of the styrene-butadiene copolymer. The latex dispersion usually includes water in an amount in the range of from about 40% to about 70% by weight of the latex, and in addition to the dispersed styrene-butadiene particles, the latex often includes small quantities of an emulsifier, polymerization catalysts, chain modifying agents and the like. The weight ratio of styrene to butadiene in the latex can range from about 10%:90% to about 90%:10%.

Styrene-butadiene latexes are often commercially produced as terpolymer latexes which include up to about 3% by weight of a third monomer to assist in stabilizing the latex emulsion. The third monomer, when present, generally is anionic in character and includes a carboxylate, sulfate or sulfonate group. Other groups that may be present on the third monomer include phosphates, phophonates or phenolics. Non-ionic groups which exhibit stearic effects and which contain long ethoxylate or hydrocarbon tails can also be present.

A particularly suitable and preferred styrene-butadiene aqueous latex contains water in an amount of about 50% by weight of the latex, and the weight ratio of styrene to butadiene in the latex is about 25%:75%. The aqueous rubber latex utilized is generally included in the cement composition of this invention in an amount in the range of from about 5% to about 45% by weight of hydraulic cement in the composition.

In order to prevent the aqueous latex from prematurely coagulating and increasing the viscosity of the cement composition, a rubber latex stabilizing surfactant is included in the composition. The rubber latex stabilizing surfactant utilized in accordance with the present invention is an iso-dodecyl alcohol ether sulfate ethoxylated with from about 10 to about 20 moles of ethylene oxide. The above rubber latex stabilizing surfactant is included in the cement composition in an amount in the range of from about 0.01% to about 0.25% by weight of the aqueous rubber latex therein.

The iso-dodecyl alcohol ether sulfate ethoxylated with from about 10 to about 20 moles of ethylene oxide rubber latex stabilizing surfactant stabilizes the aqueous rubber latex and prevents the aqueous latex from prematurely coagulating, increasing in viscosity or the like. In addition, the rubber latex stabilizing surfactant of this invention also functions in the cement composition as a dispersant. In addition, the surfactant functions to modify the cement composition rheology, functions as a mild set retarder, improves the fluid loss properties of the cement composition and provides high compressive strength to the cement composition.

The resilient cement composition of this invention as described above can also include a variety of cement composition additives including, but not limited to, a set retarder, a defoamer, crystalline silica to prevent compressive strength retrogration and heavy weight additives as for example, oxides of iron or oxides of manganese or barium sulfate to increase the density of the cement composition.

Set retarders that can be utilized in the cement composition of the present invention include, but are not limited to, tartaric acid, sulfomethylated lignosulfonate, a mixture of sulfomethylated lignosulfonate and hydroxycarboxy acids or hydroxycarboxy acids. Of these, tartaric acid is preferred. When utilized, the set retarder is present in the cement composition in an amount in the range of from about 0.5% to about 2% by weight of hydraulic cement therein.

Another additive which can be utilized in the cement composition is a defoamer comprising a mixture of polypropylene glycol, an internal olefin and activated silica. The defoamer functions to minimize air entrainment in the cement composition. When utilized, the defoamer is present in the composition in an amount in the range of from about 0.1% to about 1% by weight of hydraulic cement therein.

Another additive which can be included in the cement composition of this invention is crystalline silica which functions to prevent cement compressive strength retrogression at high temperatures. When used, the crystalline silica is included in the cement composition in an amount in the range of from about 30% to about 75% by weight of hydraulic cement therein.

Another additive that can be included in the cement composition of this invention is oxides of iron which provide density to the cement composition. When used, the oxides of iron or other heavy weight additives are present in the composition in an amount in the range of from about 10% to about 100% by weight of hydraulic cement therein.

An improved method of cementing of this invention comprises the following steps. A cement composition is prepared or provided which hardens into a resilient solid mass and has high compressive, tensile and bond strengths. The cement composition comprises a hydraulic cement, an aqueous rubber latex and a rubber latex stabilizing surfactant comprising an iso-dodecyl alcohol ether sulfate ethoxylated with from about 10 to about 20 moles of ethylene oxide. The cement composition is placed in a location to be cemented and then allowed to harden.

As described above, the cement composition can include set retarding additives, defoaming additives, crystalline silica, oxides of iron and other additives known to those skilled in the art. In addition, the cement composition can be placed in a location above ground level, in a location below ground level, in a well bore and in other locations.

A preferred resilient cement composition having improved properties of this invention comprises: a hydraulic cement; an aqueous rubber latex present in an amount in the range of from about 5% to about 45% by weight of hydraulic cement in the composition; and a rubber latex stabilizing surfactant comprising an iso-dodecyl alcohol ether sulfate ethoxylated with 10 to 20 moles of ethylene oxide.

A preferred improved method of cementing of this invention comprises the steps of: preparing or providing a cement composition which hardens into a resilient solid mass and has high compressive, tensile and bond strengths comprising a hydraulic cement, an aqueous rubber latex, and a rubber latex stabilizing surfactant comprising an iso-dodecyl alcohol ether sulfate ethoxylated with 10 to 20 moles of ethylene oxide; placing the cement composition in a location to be cemented; and allowing the cement composition to harden.

In order to further illustrate the compositions and methods of the present invention, the following examples are given.

EXAMPLE 1

The stabilizing properties of iso-dodecyl alcohol ether sulfate surfactant ethoxylated with from about 10 to about 20 moles of ethylene oxide were compared with a prior art rubber latex stabilizing surfactant comprising alcohol ether sulfonate sodium salt ethoxylated with 15 moles of ethylene oxide at 130° F. to 380° F. bottom hole circulating temperatures. The aqueous rubber latex contained 25% styrene—

75% butadiene and water in an amount of about 50% by weight of the latex. Cement compositions were prepared containing Class H cement, various amounts of the aqueous rubber latex described above, and either the prior art latex stabilizing surfactant comprising $C_{11-15}$ alcohol ether sulfonate ethoxylated with 15 moles of ethylene oxide or the latex stabilizing surfactant of the present invention comprising iso-dodecyl alcohol ether sulfate ethoxylated with from about 10 to about 20 moles of ethylene oxide. Various additives were combined with portions of the cement compositions and fluid loss, thickening time and compressive strength properties of the cement portions were determined. The results of these tests are set forth in Table I below.

ether sulfonate sodium salt ethoxylated with 15 moles of ethylene oxide, at from 130° F. to 380° F. bottom hole circulating temperatures. The densities of the cement compositions varied from 16.4 lb/gal to 18.5 lb/gal. The concentration of the aqueous rubber latex varied from 1.5 to 3 gal/sk of cement, and the concentrations of the latex stabilizing surfactants varied from 0.14 to 0.6 gal/sk, i.e., 0.1% to 0.2% of the latex. The dispersant, i.e., the sodium salt of naphthalene-formaldehyde condensate is not a pre-requisite for the latex slurries to function. For example, slurries above temperatures of 190° F. do not need the sodium salt of naphthalene-formaldehyde condensate to stabilize the latex

TABLE I

Comparison of Rubber Latex Stabilizing Surfactants In Cement Compositions

| Composition No. | Density of Cement Composition lb/gal | Aqueous Rubber Latex[1], gal/sk | Present Invention Latex Stabilizing Surfactant[2], gal/sk | Prior Art Latex Stabilizing Surfactant[3], gal/sk | Cement Set Retarder[4], gal/sk | Cement Set Retarder[5], gal/sk | Cement Dispersant[6], gal/sk | Cement Set Retarder[7], % in Cement Composition | Cement Defoamer[8], gal/sk |
|---|---|---|---|---|---|---|---|---|---|
| 1 | 16.4 | 1.5 | 0.14 | — | — | — | 0.048 | — | 0.5 |
| 2 | 16.4 | 1.5 | — | 0.14 | — | — | 0.048 | — | 0.5 |
| 3 | 16.5 | 2 | 0.188 | — | 0.01 | — | 0.143 | — | 0.5 |
| 4 | 16.5 | 2 | — | 0.188 | 0.01 | — | 0.143 | — | 0.5 |
| 5 | 18.5 | 2.5 | 0.288 | — | 0.5 | — | — | — | 0.5 |
| 6 | 18.5 | 2.5 | — | 0.288 | 0.5 | — | — | — | 0.5 |
| 7 | 18.5 | 3 | — | 0.288 | 0.5 | — | — | — | 0.5 |
| 8 | 18.5 | 3 | 0.288 | — | 0.5 | — | — | — | 0.5 |
| 9 | 18.5 | 3 | — | 0.288 | — | 0.5 | — | — | 0.5 |
| 10 | 18.5 | 3 | 0.288 | — | — | 0.5 | — | — | 0.5 |
| 11 | 18 | 3 | 0.6 | — | — | 2.5 | — | 1.0 | 0.5 |
| 12 | 18 | 3 | — | 0.6 | — | 2.5 | — | 1.0 | 0.5 |

| Composition No. | Cement Compressive Strength Retrogration Retarder[9], % in Cement Composition | Density Imparting Material[10], % in Cement Composition | Temp., ° F. | Fluid Loss, cc/30 min. | Thickening Time, Hr:Min | Compressive 24 Hr., psi | Strength 72 Hr., psi |
|---|---|---|---|---|---|---|---|
| 1 | — | — | 130 | 60 | 4:21 | 1774 | — |
| 2 | — | — | 130 | 48 | 4:56 | 1784 | — |
| 3 | — | — | 190 | 30 | 5:03 | 3020 | — |
| 4 | — | — | 190 | 28 | 5:19 | 1626 | — |
| 5 | 35 | 50 | 250 | 10 | 5:04 | 1811 | — |
| 6 | 35 | 50 | 250 | 14 | 4:52 | 1734 | — |
| 7 | 35 | 50 | 300 | 10 | 3:32 | — | 1939 |
| 8 | 35 | 50 | 300 | 16 | 1:54 | — | 2200 |
| 9 | 35 | 50 | 350 | 16 | 8:02 | — | 3260 |
| 10 | 35 | 50 | 350 | 20 | 5:35 | — | 2980 |
| 11 | 35 | 50 | 380 | 12 | 3:17 | — | 1231[11] |
| 12 | 35 | 50 | 380 | 10 | 4:14 | — | 1288[11] |

[1] 25% Styrene - 75% Butadiene Latex
[2] Iso-dodecyl alcohol ether sulfate ethoxylated with 10 to 20 moles of ethylene oxide.
[3] $C_{11}$–$C_{15}$ alcohol ether sulfonate sodium salt ethoxylated with 15 moles of ethylene oxide.
[4] Sulfomethylated lignosulfonate.
[5] A mixture of sulfomethylated lignosulfonate and hydroxycarboxy acid.
[6] Sodium salt of naphthalene sulfonate-formaldehyde condensate.
[7] Hydroxycarboxy acid.
[8] A mixture of polypropylene glycol, internal olefin and activated silica.
[9] Crystalline silica.
[10] Oxides of iron.
[11] Cured at BHST of 425° F. for 72 hrs.

Table I shows the stabilizing properties of the latex stabilizing surfactant of the present invention, i.e., iso-dodecyl alcohol ether sulfate ethoxylated with 10 to 20 moles of ethylene oxide, and compares the properties with the prior art latex stabilizing surfactant, i.e., $C_{11-15}$ alcohol slurries. The latex stabilizing surfactant described above stabilized the latex slurry without the use of a dispersant.

Table I shows the data collected for the latex which consists of 25% styrene and 75% butadiene. The cured cement slurries had excellent compressive strengths in 24 hours at the bottom hole circulating temperature from 130° F. to 250° F. To get adequate placement time above that temperature, higher concentration of retarders were used. As a result, from 250° F. to 350° F. the slurries were cured for 72 hours. Bottom hole circulating temperatures of 380° F. are equal to 425° F. bottom hole static temperatures. At 380° F., 3 gallons per sack of the latex consisting of 25% styrene and 75% butadiene were used, and the slurries were cured at 425° F. bottom hole static temperature for 72 hours. When 3 gallons of the latex were used per sack, the cured cement cubes showed resilient properties as reflected by the lack of extremely high compressive strengths.

EXAMPLE 2

In Example 2, a cement composition comprising Class H cement, 1.5 gal/sk of latex containing 30% styrene and 70% butadiene, 0.05 gal/sk of defoamer (a mixture of polypropylene glycol, internal olefin and activated silica) and 0.04 gal/sk of the sodium salt of naphthalene sulfonate-formaldehyde condensate. To a first portion of the slurry, the prior art latex stabilizing surfactant described above was added in an amount of 0.14 gal/sk. To another portion of the cement composition, the latex stabilizing surfactant of the present invention as described above was added to the cement composition. The cement compositions were tested for fluid loss, thickening time and compressive strength. The results of the tests are given in Table II below.

TABLE II

Class H Cement, 1.5 gal/sk 30% Styrene-70% Butadiene Latex, 0.05 gal/sk Cement Defoamer[1], 0.04 gal/sk Cement Dispersant[2], and Latex Stabilizing Surfactants (16.4 lb/gal)

| Present[3] Invention Latex Stabilizing Surfactant (gal/sk) | Prior Art[4] Latex Stabilizing Surfactant (gal/sk) | Temp., °F. | Fluid Loss, cc/30 min. | Thickening Time, Hr:Min | Compressive Strength, psi/72 hrs |
|---|---|---|---|---|---|
| 0.14 | | 130 | 62 | 4:46 | 3300 |
| | 0.14 | 130 | 26 | 5:58 | 2630 |

[1]Mixture of polypropylene glycol, internal olefin and activated silica.
[2]Sodium salt of naphthalene sulfonate-formaldehyde condensate.
[3]Iso-dodecyl alcohol ether sulfate ethoxylated with 10 to 20 moles of ethylene oxide.
[4]$C_{11}$–$C_{15}$ alcohol ether sulfonate sodium salt ethoxylated with 15 moles of ethylene oxide.

From Table II, it can be seen that the cement composition including the latex stabilizing surfactant of this invention had less thickening time and higher compressive strength.

EXAMPLE 3

Another cement composition was prepared comprising Class H cement, 2 gal/sk of the latex described in Example 2, 0.05 gal/sk of defoamer, 0.143 gal/sk of dispersant, and 0.022 gal/sk of sulfomethylated lignosulfonate set retarder. The cement slurry was divided into two portions and the latex stabilizing surfactant of the present invention was added to one portion with the prior art latex stabilizing surfactant being added to the second portion. The portions were tested at 190° F. for fluid loss, thickening time and compressive strength. The results of the tests are shown in Table III, below.

TABLE III

Class H Cement, 2.0 gal/sk 30% Styrene-70% Butadiene Latex, 0.05 gal/sk Cement Defoamer[1], 0.143 gal/sk Cement Dispersant[2], 0.022 gal/sk Set Retarder[3] and Latex Stabilizing Surfactants (16.4 lb/gal)

| Present[4] Invention Latex Stabilizing Surfactant (gal/sk) | Prior Art[5] Latex Stabilizing Surfactant (gal/sk) | Temp., °F. | Fluid Loss, cc/30 min. | Thickening Time, Hr:Min | Compressive Strength, psi/72 hrs |
|---|---|---|---|---|---|
| 0.188 | | 190 | 30 | 8:36 | 2770 |
| | 0.188 | 190 | 14 | 6:53 | 2490 |

[1]Mixture of polypropylene glycol, internal olefin and activated silica.
[2]Sodium salt of naphthalene sulfonate-formaldehyde condensate.
[3]Sulfomethylated lignosulfonate.
[4]Iso-dodecyl alcohol ether sulfate ethoxylated with 10 to 20 moles of ethylene oxide.
[5]$C_{11}$–$C_{15}$ alcohol ether sulfonate sodium salt ethoxylated with 15 moles of ethylene oxide.

From Table III, it can be seen that the latex stabilizing surfactant of the present invention has better compressive strength than the prior art surfactant.

EXAMPLE 4

Another cement composition was prepared comprising Class H cement; crystalline silica flour present in an amount of 17.5% by weight of cement; coarse crystalline silica present in an amount of 17.5% by weight of cement; oxides of iron present in an amount of 11.17% by weight of cement; dead burnt magnesium oxide present in an amount of 2.5% by weight of cement; a copolymer of AMPS and N,N-dimethylacrylamide fluid loss control additive present in an amount of 0.4% by weight of cement; graft lignite polymer fluid loss control additive present in an amount of 0.4% by weight of cement; fine crystalline silica treated with acetic acid present in an amount of 0.07% by weight of cement; a mixture of polypropylene glycol, $C_{14}$–$C_{16}$ internal olefin and hydrophobic silica absorbed on diatomaceous earth present in an amount of 0.25% by weight of cement; a sodium bisulfite condensation of formaldehyde and acetone dispersant present in an amount of 0.5% by weight of cement; a mixture of sulfomethylated lignin and hydroxycarboxy acid in an amount of 0.27 gal/sk; a mixture of polypropylene glycol, $C_{14}$–$C_{16}$ internal olefin and hydrophobic silica in an amount of 0.05 gal/sk; 70% butadiene-30% styrene latex present in an amount of 1.0 gal/sk.

The cement slurry was divided into four portions and the prior art latex stabilizing surfactant was added to the first portion with the latex stabilizing surfactant of the present invention being added to the second portion. The first and second portions were tested at 80° F., 140° F. and 180° F. for rheology. To the third portion, the prior art latex stabilizing surfactant was added and to the fourth portion, the latex stabilizing surfactant of the present invention was added. The third and fourth portions were tested for thickening time, fluid loss at a temperature of 326° F. BHCT and 24 hour compressive strength at 380° F. bottom hole static temperature. The results of these tests are set forth in Tables IV and V.

TABLE IV

| Present[1] Invention Latex Stabilizing Surfactant | Prior Art[2] Latex Stabilizing Surfactant | Temp. (° F.) | Rheology Fann 35 | | | | | |
|---|---|---|---|---|---|---|---|---|
| | | | 300 rpm | 200 rpm | 100 rpm | 6 rpm | 3 rpm | 600 rpm |
| 0.20 gal/sk | — | 80 | 560 | 416 | 256 | 46 | 35 | 600+ |
| — | 0.20 gal/sk | 80 | 520 | 380 | 232 | 44 | 35 | 600+ |
| 0.20 gal/sk | — | 140 | 404 | 314 | 188 | 38 | 22 | 600+ |
| — | 0.20 gal/sk | 140 | 382 | 288 | 176 | 36 | 30 | 600+ |
| 0.20 gal/sk | — | 180 | 326 | 242 | 148 | 28 | 22 | 552 |
| — | 0.20 gal/sk | 180 | 251 | 192 | 129 | 29 | 26 | 520 |

[1]Iso-dodecyl alcohol ether sulfate ethoxylated with 10 to 20 moles of ethylene oxide.
[2]$C_{11}$–$C_{15}$ alcohol ether sulfonate sodium salt ethoxylated with 15 moles of ethylene oxide.

TABLE V

| Present Invention Latex Stabilizing Surfactant | Prior Art Latex Stabilizing Surfactant | Temp., ° F. | Thickening Time | Fluid Loss, cc | Compressive Strength at 380° F. |
|---|---|---|---|---|---|
| Iso-dodecyl alcohol ether sulfate ethoxylated with 10 to 20 moles of ethylene oxide | | 326 | 3 hr; 26 min | 36 | 4133 psi (24 hr.) |
| | $C_{11}$–$C_{15}$ alcohol ether sulfonate sodium salt ethoxylated with 15 moles of ethylene oxide | 326 | 3 hr; 15 min | 27 | 4224 psi (24 hr.) |

From Tables IV and V, it can be seen that the rubber latex stabilizing surfactant of the present invention functions better or equal to the prior art surfactant.

Thus, the present invention is well adapted to carry out the objects and attain the ends and advantages mentioned as well as those inherent therein. While numerous changes may be made by those skilled in the art, such changes are encompassed within the spirit of this invention as defined by the appended claims.

What is claimed is:

1. A cement composition comprising:
   a hydraulic cement;
   an aqueous rubber latex; and
   a rubber latex stabilizing surfactant comprising an iso-dodecyl alcohol ether sulfate ethoxylated with 10 to 20 moles of ethylene oxide, wherein the rubber latex stabilizing surfactant is present in the composition in an amount in the range of from about 0.01% to about 0.25% by weight of the aqueous rubber latex therein.

2. The composition of claim 1 wherein the hydraulic cement comprises Portland cement, slag cement, pozzolana cement, gypsum cement, aluminous cement or silica cement.

3. The composition of claim 1 wherein the hydraulic cement is Portland cement.

4. The composition of claim 1 wherein the aqueous rubber latex is present in an amount in the range of from about 5% to about 45% by weight of hydraulic cement in the composition.

5. The composition of claim 1 wherein the aqueous rubber latex comprises aqueous cis-polyisoprene rubber latex, aqueous nitrile rubber latex, aqueous ethylene-propylene rubber latex, aqueous styrene-butadiene rubber latex, aqueous nitrile-butadiene rubber latex, aqueous butyl rubber latex, or aqueous neoprene rubber latex.

6. The composition of claim 1 wherein the aqueous rubber latex is an aqueous styrene-butadiene rubber latex.

7. The composition of claim 6 wherein the aqueous styrene-butadiene rubber latex contains water in an amount of about 50% by weight of the latex.

8. The composition of claim 6 wherein the weight ratio of styrene to butadiene in the latex ranges from 95% styrene: 5% butadiene to 5% styrene:95% butadiene.

9. The composition of claim 1 further comprising a set retarder comprising tartaric acid, sulfomethylated lignosulfonate, a mixture of sulfomethylated lignosulfonate and a hydroxycarboxy acid, or a hydroxycarboxy acid.

10. The composition of claim 9 wherein the set retarder is present in the composition in an amount in the range of from about 0.5% to about 2% by weight of hydraulic cement therein.

11. The composition of claim 1 further comprising a defoamer comprising a mixture of polypropylene glycol, an internal olefin and activated silica.

12. The composition of claim 11 wherein the defoamer is present in the composition in an amount in the range of from about 0.1% to about 1% by weight of hydraulic cement therein.

13. The composition of claim 1 further comprising crystalline silica to prevent cement compressive strength retrogression.

14. The composition of claim 13 wherein the crystalline silica is present in the composition in an amount in the range of from about 30% to about 75% by weight of hydraulic cement therein.

15. The composition of claim 1 further comprising oxides of iron or other heavy weight additives to provide density to the composition.

16. The composition of claim 15 wherein the oxides of iron or other heavy weight additives are present in the composition in an amount in the range of from about 10% to about 100% by weight of hydraulic cement therein.

17. A cement composition comprising:
   a hydraulic cement;
   an aqueous rubber latex comprising aqueous cis-polyisoprene rubber latex, aqueous nitrile rubber latex, aqueous ethylene-propylene rubber latex, aqueous styrene-butadiene rubber latex, aqueous nitrile-butadiene rubber latex, rubber latex, aqueous butyl rubber latex, or aqueous neoprene rubber latex and present in an amount in the range of from about 5% to about 45% by weight of hydraulic cement in the composition; and a rubber latex stabilizing surfactant comprising an iso-dodecyl alcohol ether sulfate ethoxylated with 10 to 20 moles of ethylene oxide and present in the composition in an amount in the range of from about 0.01% to about 0.25% by weight of the aqueous rubber latex therein.

18. The composition of claim 17 wherein the aqueous rubber latex is the aqueous styrene-butadiene rubber latex.

19. The composition of claim 18 wherein the weight ratio of styrene to butadiene in the latex ranges from 95% styrene:5% butadiene to 5% styrene:95% butadiene.

20. The composition of claim 17 further comprising a set retarder, a defoamer, crystalline silica, a heavy weight additive, or combinations thereof.

* * * * *

UNITED STATES PATENT AND TRADEMARK OFFICE
CERTIFICATE OF CORRECTION

| | | |
|---|---|---|
| PATENT NO. | : 7,022,755 B1 | Page 1 of 1 |
| APPLICATION NO. | : 11/051020 | |
| DATED | : April 4, 2006 | |
| INVENTOR(S) | : Jiten Chatterji et al. | |

It is certified that error appears in the above-identified patent and that said Letters Patent is hereby corrected as shown below:

In line 5 of the Abstract of the Disclosure, please replace "sulfonate" with "sulfate".

Signed and Sealed this

Seventh Day of November, 2006

JON W. DUDAS
*Director of the United States Patent and Trademark Office*